US012683735B2

(12) United States Patent
Harada et al.

(10) Patent No.: US 12,683,735 B2
(45) Date of Patent: Jul. 14, 2026

(54) TERMINAL, BASE STATION, AND RADIO COMMUNICATION METHOD

(71) Applicant: NTT DOCOMO, INC., Tokyo (JP)

(72) Inventors: Hiroki Harada, Tokyo (JP); Daisuke Kurita, Tokyo (JP); Mayuko Okano, Tokyo (JP); Satoshi Nagata, Tokyo (JP); Masaya Okamura, Tokyo (JP); Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 397 days.

(21) Appl. No.: 18/262,788

(22) PCT Filed: Jan. 26, 2021

(86) PCT No.: PCT/JP2021/002693
§ 371 (c)(1),
(2) Date: Jul. 25, 2023

(87) PCT Pub. No.: WO2022/162748
PCT Pub. Date: Aug. 4, 2022

(65) Prior Publication Data
US 2024/0405937 A1 Dec. 5, 2024

(51) Int. Cl.
*H04L 5/00* (2006.01)

(52) U.S. Cl.
CPC ................................... *H04L 5/0048* (2013.01)

(58) Field of Classification Search
CPC ...................................................... H04L 5/0048
See application file for complete search history.

(56) References Cited

U.S. PATENT DOCUMENTS

| | | | |
|---|---|---|---|
| 9,425,935 B2 * | 8/2016 | You | H04L 5/003 |
| 2018/0103433 A1 | 4/2018 | Li et al. | |
| 2019/0363810 A1 * | 11/2019 | Luo | H04B 17/345 |
| 2020/0366398 A1 * | 11/2020 | Takeda | H04L 5/0053 |
| 2022/0225151 A1 * | 7/2022 | Zhang | H04W 24/10 |
| 2022/0361200 A1 | 11/2022 | Yoshioka et al. | |

FOREIGN PATENT DOCUMENTS

| | | | | |
|---|---|---|---|---|
| EP | 3720198 A1 * | 10/2020 | | H04W 72/21 |
| JP | 2016-519474 A | 6/2016 | | |
| WO | 2021002012 A1 | 1/2021 | | |

OTHER PUBLICATIONS

3GPP TS 38.211 V16.4.0; "3rd Generation Partnership Project; Technical Specification Group Radio Access Network; NR; Physical channels and modulation (Release 16)"; Dec. 2020 (133 pages).
International Search Report issued in PCT/JP2021/002693 on Sep. 7, 2021 (8 pages).
Written Opinion of the International Searching Authority issued in PCT/JP2021/002693 on Sep. 7, 2021 (4 pages).
Office Action isssued in Japanese Application No. 2022-577845, mailed Oct. 29, 2024 (7 pages).
Extended European Search Report in counterpart European Application No. 21922772.5 issued Feb. 17, 2025 (9 pages).

* cited by examiner

*Primary Examiner* — Duc C Ho
(74) *Attorney, Agent, or Firm* — Osha Bergman Watanabe & Burton LLP

(57) ABSTRACT
A terminal comprises: a transmission unit that transmits a reference signal used for a purpose other than a measurement related to a radio resource management; and a control unit that assumes the measurement related to the radio resource management is performed using the reference signal.

6 Claims, 9 Drawing Sheets

FR1
[15,30,60] kHz SCS
5~100 MHz BW

FR2
[60,120,(240)] kHz SCS
50~400 MHz BW

FR2x 0.41 GHz    1 GHz    7.125 GHz    10 GHz    24.25 GHz    52.6 GHz    71 GHz    100 GHz

TERMINAL, BASE STATION, AND RADIO COMMUNICATION METHOD

TECHNICAL FIELD

The present disclosure relates to a terminal, a base station, and a radio communication method for performing radio communication, and more particularly, to a terminal, a base station, and a radio communication method for performing communication concerning a reference signal.

BACKGROUND ART

The 3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Here, the gNB (cell) transmits a reference signal that covers the coverage area of the gNB. The reference signal may be SSB (Synchronization Signal/PBCH Block), CSI-RS (Channel State Information-Reference Signal), or PRS (Positioning Reference Signal) (For example, Non-Patent Literature 1).

CITATION LIST

Non-Patent Literature

[Non-Patent Literature 1]
3GPP TS 38.211 V 16.4.0 "3rd Generation Partnership Project; Technical Specification Group Radio Access Network; NR; Physical channels and modulation (Release 16), December 2020

SUMMARY OF INVENTION

In recent years, a cell configuration (User centric no cell) based on UE (User Equipment) has been proposed instead of a cell configuration based on gNB. In such a User centric no cell, the arrival range of the UL signal transmitted from the UE is treated as a virtual cell of the UE. In such a configuration, it is assumed that the UE transmits various UL signals (reference signals) by time division using one or more beams to cover the coverage area of the virtual cell. Under such an assumption, if the number of beams transmitted by the UE increases, the UE overhead and power consumption increase. The possibility of transmitting the beam (reference signal) in the direction in which there is no gNB also increases.

It is therefore an object of the present invention to provide a terminal, a base station, and a radio communication method which can reduce the overhead and power consumption associated with the transmission of a reference signal while covering a coverage area.

An aspect of the present disclosure is a terminal comprising: a transmission unit that transmits a reference signal used for a purpose other than a measurement related to a radio resource management; and a control unit that assumes the measurement related to the radio resource management is performed using the reference signal.

An aspect of the present disclosure is a terminal comprising: a reception unit that receives a notification indicating a transmission of a dynamic reference signal dynamically transmitted as a reference signal used for a measurement related to a radio resource management; and a transmission unit that transmits the dynamic reference signal based on the notification.

An aspect of the present disclosure is a base station comprising: a reception unit that receives a reference signal used for a purpose other than a measurement related to a radio resource management; and a control unit that performs the measurement related to the radio resource management using the reference signal.

An aspect of the present disclosure is a base station comprising: a transmission unit that transmits a notification indicating a transmission of a dynamic reference signal dynamically transmitted as a reference signal used for a measurement related to a radio resource management; a reception unit that receives the dynamic reference signal; and a control unit that performs the measurement related to the radio resource management using the dynamic reference signal.

An aspect of the present disclosure is a radio communication method comprising: transmitting a reference signal used for a purpose other than a measurement related to a radio resource management; and assuming the measurement related to the radio resource management is performed using the reference signal.

An aspect of the present disclosure is a radio communication method comprising: receiving a notification indicating a transmission of a dynamic reference signal dynamically transmitted as a reference signal used for a measurement related to a radio resource management; and transmitting the dynamic reference signal based on the notification.

BRIEF DESCRIPTION OF DRAWINGS

FIG. 3 shows an exemplary configuration of a radio frame, subframe, and slot used in a radio communication system 10.

FIG. 6 is a background view.

DESCRIPTION OF EMBODIMENTS

Figure 1:
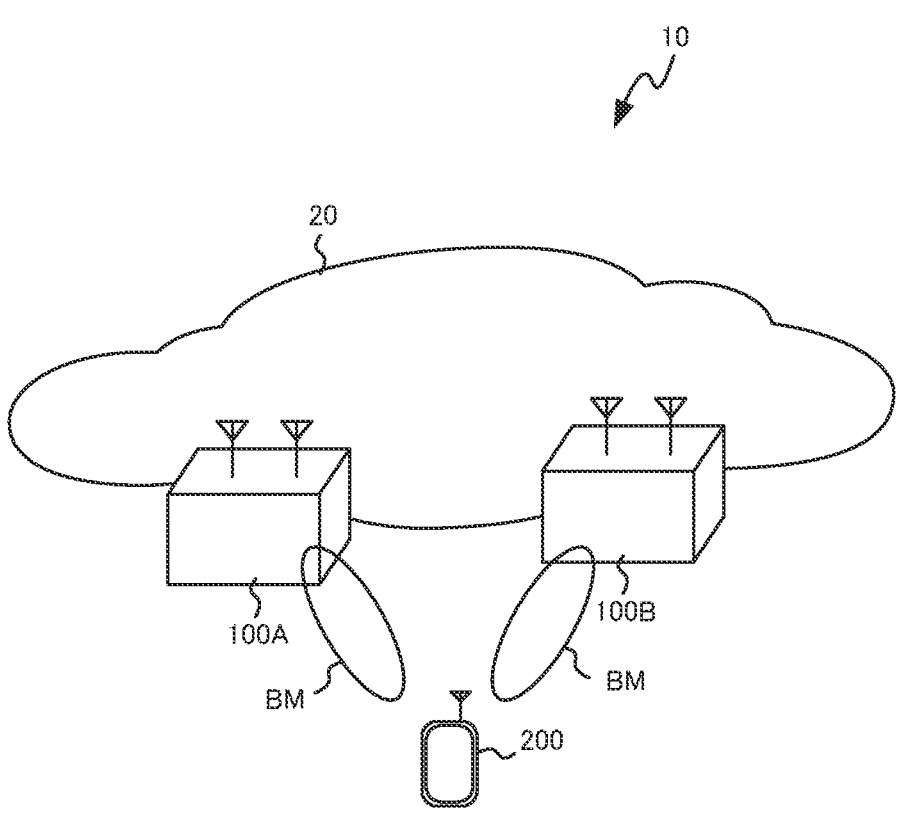
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

EMBODIMENTS

(1) Overall Schematic Configuration of the Radio Communication System

FIG. 1 is an overall schematic configuration diagram of a radio communication system 10 according to an embodiment. The radio communication system 10 is a 5G New Radio (NR) compliant radio communication system and includes the Next Generation-Radio Access Network 20 (Below, UE 200). NG-RAN 20, and terminal 200.

The radio communication system 10 may be a radio communication system that follows a scheme called Beyond 5G, 5G Evolution or 6 G.

The NG-RAN 20 includes a radio base station 100 A (gNB 100 A) and a radio base station 100 B (gNB 100 B). The specific configuration of radio communication system 10 including the number of gNBs and UEs is not limited to the example shown in FIG. 1.

The NG-RAN 20 actually includes a plurality of NG-RAN Nodes, specifically, gNBs (or ng-eNBs), and is connected to a core network (5GC, not shown) according to 5 G or 6 G. Note that the NG-RAN 20 and 5 GC may be expressed simply as a "network".

The gNB 100 A and the gNB 100 B are radio base stations according to 5G or 6G, and perform radio communication according to 5G or 6G with the UE 200. By controlling radio signals transmitted from a plurality of antenna elements, the gNB 100 A, the gNB 100 B, and the UE 200 can support Massive MIMO (Multiple-Input Multiple-Output) for generating a beam BM having a higher directivity, carrier aggregation (CA) for bundling a plurality of component carriers (CC), and dual connectivity (DC) for communicating with two or more transport blocks simultaneously between the UE and each of the two NG-RAN Nodes.

Figure 2:
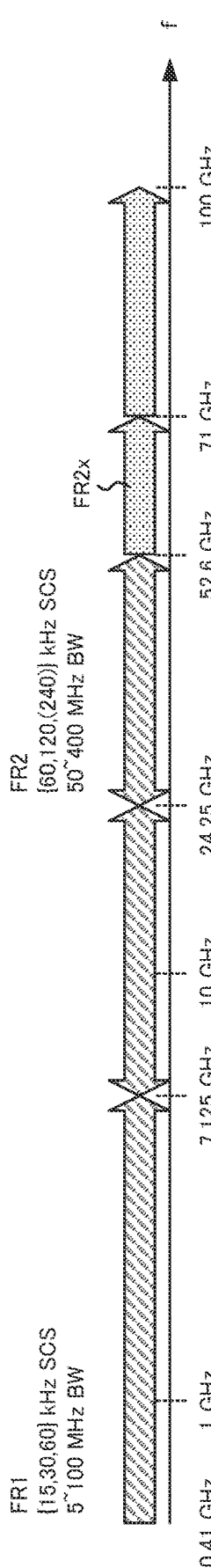
FIG. 2 is a diagram illustrating the frequency range used in radio communication system 10.

The radio communication system 10 corresponds to a plurality of frequency ranges (FR). FIG. 2 shows the frequency range used in radio communication system 10.

As shown in FIG. 2, the radio communication system 10 corresponds to FR1 and FR2. The frequency bands of each FR are as follows.

FR 1: 410 MHz to 7.125 GHz

FR 2: 24.25 GHz to 52.6 GHz

In FR 1, 15, 30 or 60 kHz Sub-Carrier Spacing (SCS) may be used and a 5~100 MHz bandwidth (BW) may be used. FR 2 is a higher frequency than FR 1, and an SCS of 60 or 120 kHz (240 kHz may be included) may be used, and a bandwidth (BW) of 50~400 MHz may be used.

The SCS may be interpreted as numerology. Numerology is defined in 3 GPP TS 38.300 and corresponds to one subcarrier interval in the frequency domain.

Furthermore, the radio communication system 10 also supports higher frequency bands than the FR 2 frequency band. Specifically, the radio communication system 10 supports the frequency band above 52.6 GHz up to 114.25 GHz. Such a high frequency band may be referred to as "FR2×" for convenience.

To solve this problem, when using a band above 52.6 GHz, cyclic prefix-orthogonal frequency division multiplexing (CP-OFDM)/discrete Fourier transform-spread (DFT-S-OFDM) with larger sub-carrier spacing (SCS) may be applied.

Figure 3:
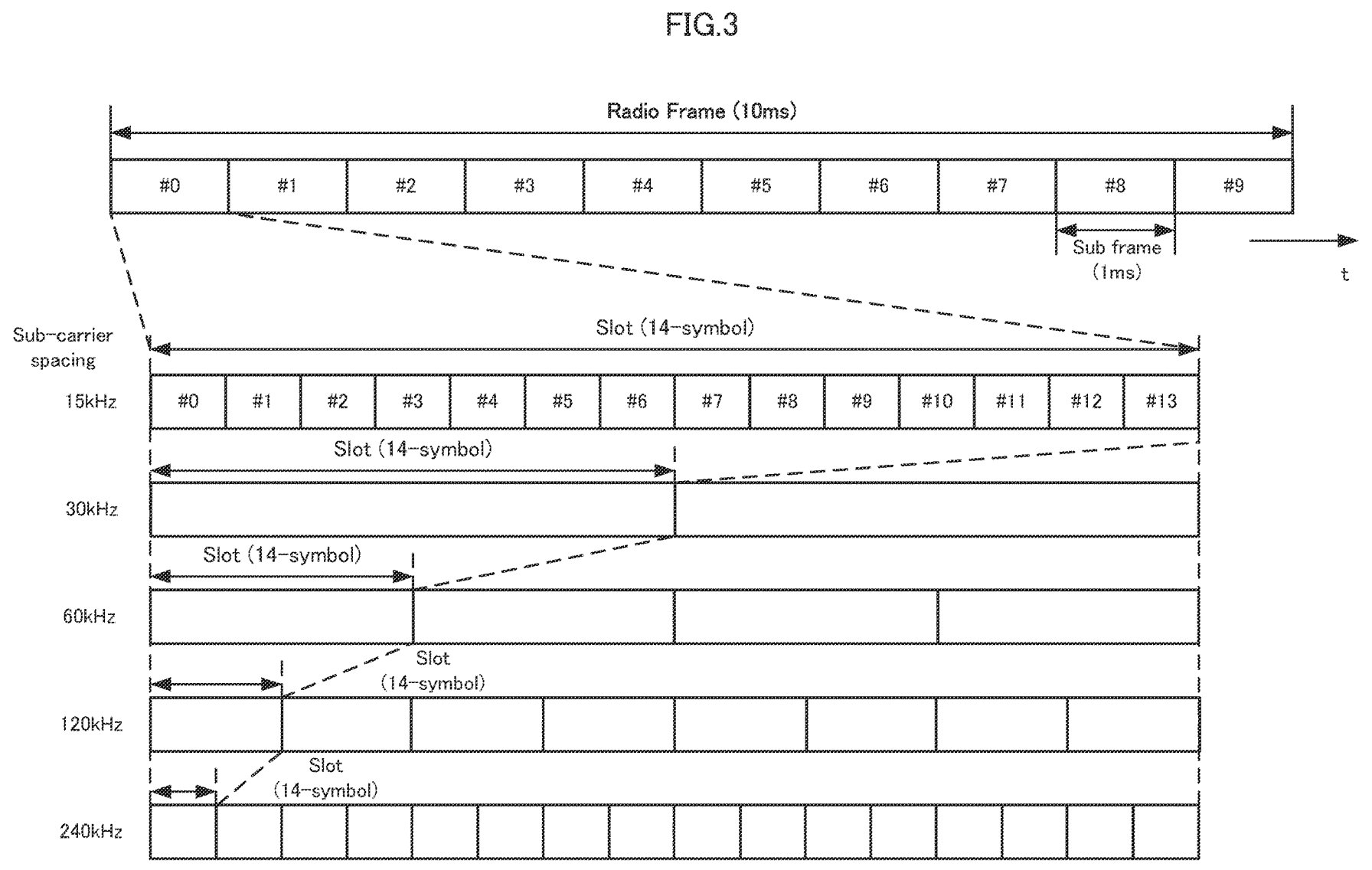

FIG. 3 shows a configuration example of a radio frame, a sub-frame and a slot used in radio communication system 10.

As shown in FIG. 3, one slot comprises 14 symbols, and the larger (wider) the SCS, the shorter the symbol period (and the slot period). The SCS is not limited to the spacing (frequency) shown in FIG. 3. For example, 480 kHz, 960 kHz, and the like may be used.

The number of symbols constituting 1 slot is not necessarily 14 (For example, 28, 56 symbols). Furthermore, the number of slots per subframe may vary depending on the SCS.

The time direction (t) shown in FIG. 3 may be referred to as a time region, a symbol period or a symbol time. The frequency direction may be referred to as a frequency domain, a resource block, a subcarrier, a bandwidth part (BWP), or the like.

(2) Function Block Configuration of Radio Communication System

Next, the functional block configuration of radio communication system 10 will be described.

First, the functional block configuration of the UE 200 will be described.

Figure 4:
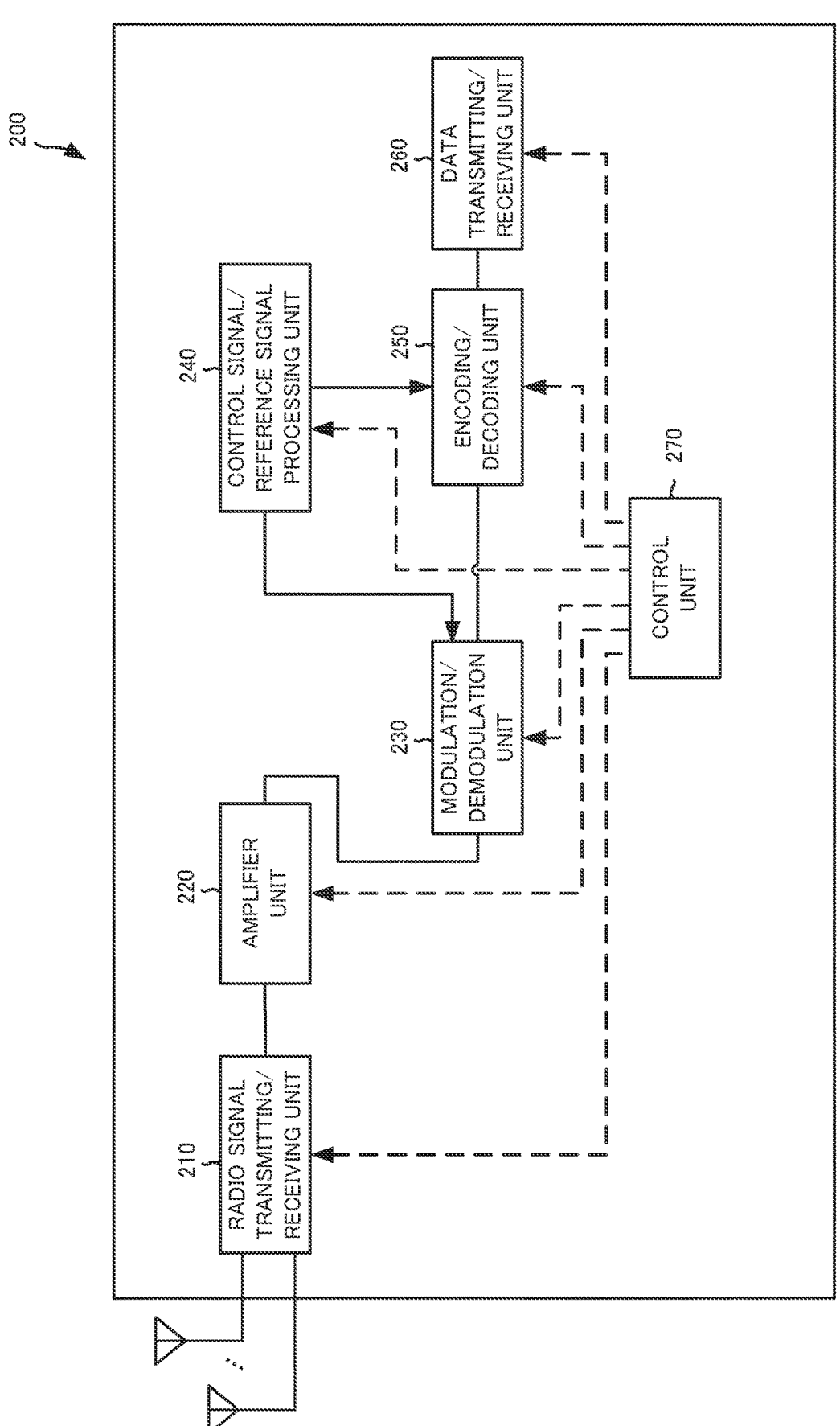
FIG. 4 is a functional block diagram of the UE 200.

FIG. 4 is a functional block diagram of the UE 200. As shown in FIG. 4, the UE 200 includes a radio signal transmission/reception unit 210, an amplifier unit 220, a modulation/demodulation unit 230, a control signal/reference signal processing unit 240, an encoding/decoding unit 250, a data transmission/reception unit 260 and a control unit 270.

The radio signal transmission/reception unit 210 transmits and receives radio signals in accordance with NR or 6 G. radio signal transmission/reception unit 210 supports Massive MIMO, CA with multiple CCs bundled together, and DC with simultaneous communication between the UE and each of the 2 NG-RAN Nodes.

The amplifier unit 220 is composed of a PA (Power Amplifier)/LNA (Low Noise Amplifier) and the like. The amplifier unit 220 amplifies the signal output from modulation/demodulation unit 230 to a predetermined power level. The amplifier unit 220 also amplifies the RF signal output from radio signal transmission/reception unit 210.

The modulation/demodulation unit 230 performs data modulation/demodulation, transmission power setting, resource block allocation and the like for each predetermined communication destination (gNB 100 or other gNB). In modulation/demodulation unit 230, Cyclic Prefix-Orthogonal Frequency Division Multiplexing (CP-OFDM)/Discrete Fourier Transform-Spread (DFT-S-OFDM) may be applied. The DFT-S-OFDM may be used not only in the uplink (UL) but also in the downlink (DL).

The control signal/reference signal processing unit 240 executes processing related to various control signals transmitted and received by the UE 200 and processing related to various reference signals transmitted and received by the UE 200.

First, the control signal/reference signal processing unit 240 receives various control signals transmitted from the gNB 100. For example, the various control signals may include RRC control signals, DCI (Downlink Control Information), and MAC CE control signals. The control signal/reference signal processing unit 240 transmits various control signals to the gNB 100 through the control channel. For example, the various control signals may include RRC control signals, UCI (Uplink Control Information), and MAC CE control signals.

The DCI may include fields that store existing fields such as DCI Formats, Carrier Indicator (CI), BWP Indicator, FDRA (Frequency Domain Resource Allocation), TDRA (Time Domain Resource Allocation), MCS (Modulation and Coding Scheme), HPN (HARQ Process Number), NDI (New Data Indicator), and RV (Redundancy Version).

The value stored in the DCI Format field is an information element that specifies the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by the information element (BandwidthPart-Config) contained in the RRC message. The value stored in the FDRA field is an information element that specifies the frequency domain resource to which the DCI applies. The frequency domain resource is specified by a value stored in the FDRA field and an information element (RA Type) contained in the RRC message. The value stored in the TDRA field is an information element that specifies the time domain resource to which the DCI applies. The time domain resource is specified by a value stored in the TDRA field and an information element (pdsch-TimeDomainAllocationList, pusch-TimeDomainAllocationList) contained in the RRC message. The time domain resource may be specified by a value stored in the TDRA field and a default table. The value stored in the MCS field is an information element that specifies the MCS to which the DCI applies. The MCS is specified by the values stored in the MCS and the MCS table. The MCS table may be specified by an RRC message or specified by RNTI scrambling. The value stored in the HPN field is an information element that specifies the HARQ Process to which the DCI applies. The value stored in the NDI is an information element for specifying whether or not the data to which the DCI is applied is the first transmission data. The value stored in the RV field is an information element that specifies the redundancy of the data to which the DCI applies.

Second, the control signal/reference signal processing unit 240 receives various reference signals transmitted from the gNB 100. For example, the various reference signals may include DMRS, CSI-RS (Channel State Information-Reference Signal), PRS (Positioning Reference Signal), and PTRS (Phase Tracking Reference Signal) for DL. The SSB (Synchronization Signal/PBCH Block) may be considered as a kind of reference signal. The control signal/reference signal processing unit 240 transmits various reference signals to the gNB 100. For example, the various reference signals may include DMRS for UL, PTRS for UL, Sounding Reference Signal (SRS), and the like.

The DMRS for DL is a known sequence of 200 UEs used for demodulation of data. For example, DMRS for DL is used for decoding PDSCH (Physical Downlink Shared Channel).

The CSI-RS is a known sequence of 200 UEs used for channel state estimation. The CSI-RS may include periodic CSI-RS that are transmitted periodically, semi-persistent CSI-RS that are transmitted semi-persistently, or Aperiodic CSI-RS that are transmitted dynamically.

The PRS is a known sequence of 200 UEs used for terminal positioning. For the position measurement of the terminal, PRS RSRP (Reference Signal Reception Power), RSTD (Reference Signal Time Difference), Rx-Tx Time Difference, etc. are specified. The PRS is a reference signal that is periodically transmitted.

The PTRS for DL is a known sequence of 200 UEs used for estimating phase noise which is a problem in a high frequency band. For example, the PTRS for DL is used to estimate the phase noise of the PDSCH.

The DMRS for UL is a known sequence of 200 UEs used for demodulation of data. For example, DMRS for UL is used for decoding PUSCH (Physical Uplink Shared Channel).

The PTRS for UL is a known sequence of 200 UEs used to estimate phase noise which is a problem in a high frequency band. For example, the PTRS for UL is used to estimate the phase noise of the PUSCH.

The SRS is a known sequence of 200 UEs used for channel state estimation. SRS is used for scheduling, massive MIMO, beam management, etc. The SRS may be used to measure the position of the terminal.

The channel includes a control channel and a data channel. The control channel includes a PDCCH (Physical Downlink Control Channel), a PUCCH (Physical Uplink Control Channel), a RACH (Random Access Channel), a Physical Broadcast Channel (PBCH), and the like. The data channel includes PDSCH, PUSCH and the like. Data means data transmitted over a data channel. The data channel may be read as a shared channel.

In an embodiment, the control signal/reference signal processing unit 240 may comprise a transmission unit for transmitting a reference signal (second RS) used for a second purpose different from the first purpose.

In embodiments, the control signal/reference signal processing unit 240 may configure a reception unit to receive notifications indicating the transmission of a dynamic reference signal (dynamic RS) that is dynamically transmitted as a reference signal for use in a particular purpose. The control signal/reference signal processing unit 240 may configure transmission unit to transmit a dynamic RS based on a notification indicating the transmission of the dynamic RS.

The encoding/decoding unit 250 executes data division/connection, the channel coding/decoding and the like for each predetermined communication destination (gNB 100 or other gNB).

Specifically, the encoding/decoding unit 250 divides the data output from data transmission/reception unit 260 into predetermined sizes, and executes channel coding on the divided data. The encoding/decoding unit 250 decodes the data output from modulation/demodulation unit 230 and connects the decoded data.

The data transmission/reception unit 260 sends and receives protocol data units (PDU) and service data units (SDU). Specifically, the data transmission/reception unit 260 performs assembly/disassembly of PDUs/SDUs in a plurality of layers (Media access control layer (MAC), wireless link control layer (RLC), and packet data convergence protocol layer (PDCP), etc.). The data transmission/reception unit 260 executes error correction and retransmission control of the data based on the HARQ (Hybrid Automatic Repeat Request).

The control unit 270 controls each functional block constituting the UE 200. In an embodiment, the control unit 270 may configure a control unit in which measurements for a first purpose are assumed to be performed with a second RS transmitted for use in a second purpose different from the first purpose.

Next, the functional block configuration of the gNB 100 will be described.

Figure 5:
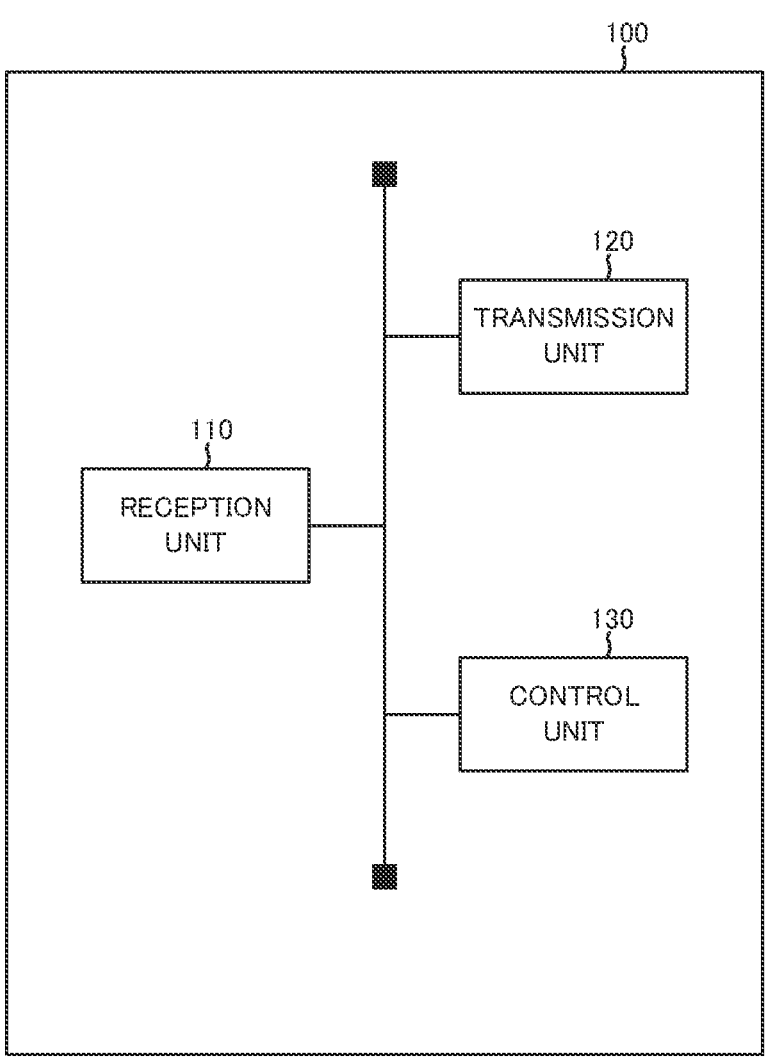
FIG. 5 is a functional block diagram of the gNB 100.

FIG. 5 is a functional block diagram of the gNB 100. As shown in FIG. 5, the gNB 100 has a reception unit 110, a transmission unit 120 and a control unit 130.

The reception unit 110 receives various signals from the UE 200. The reception unit 110 may receive UL signals over a UL channel such as PUCCH or PUSCH.

In an embodiment, reception unit 120 may comprise a reception unit that receives a second reference signal (second RS) that is transmitted for use in a second purpose other than the first purpose. In embodiments, reception unit 120 may comprise a reception unit that receives a dynamic RS.

The transmission unit 120 transmits various signals to the UE 200. The transmission unit 120 may transmit a DL signal over a DL channel, such as PDCCH or PDSCH.

In an embodiment, transmission unit 120 may configure a transmission unit to send a notification instructing the transmission of a dynamic reference signal (dynamic RS) that is dynamically transmitted as a reference signal for a specific purpose.

The control unit 130 controls the gNB 100. In an embodiment, the control unit 130 may comprise a control unit performing measurements for a first purpose with a second RS being transmitted for use in a second purpose different from the first purpose. In embodiments, the control unit 130 may comprise a control unit that performs measurements for a particular purpose using a dynamic RS.

(3) Background

The background of the embodiment will be described below. Here, attention is paid to a cell configuration (User centric no cell) based on the UE 200. In the user centric no cell, the arrival range of the UL signal transmitted from the UE 200 is treated as a virtual cell of the UE. Here, a case where the UL signal is a reference signal (hereinafter, periodic RS) periodically transmitted for a specific purpose will be described by way of example.

The specific purpose may be a measurement related to a radio resource management (hereinafter RRM Measurement), a measurement related to reception quality in a physical layer (hereinafter L1-RSRP_SINR measurement), or a measurement related to a position of the UE 200 (hereinafter Positioning Measurement). The periodic RS may be regarded as a reference signal newly introduced for the specific purpose described above.

Figure 6:
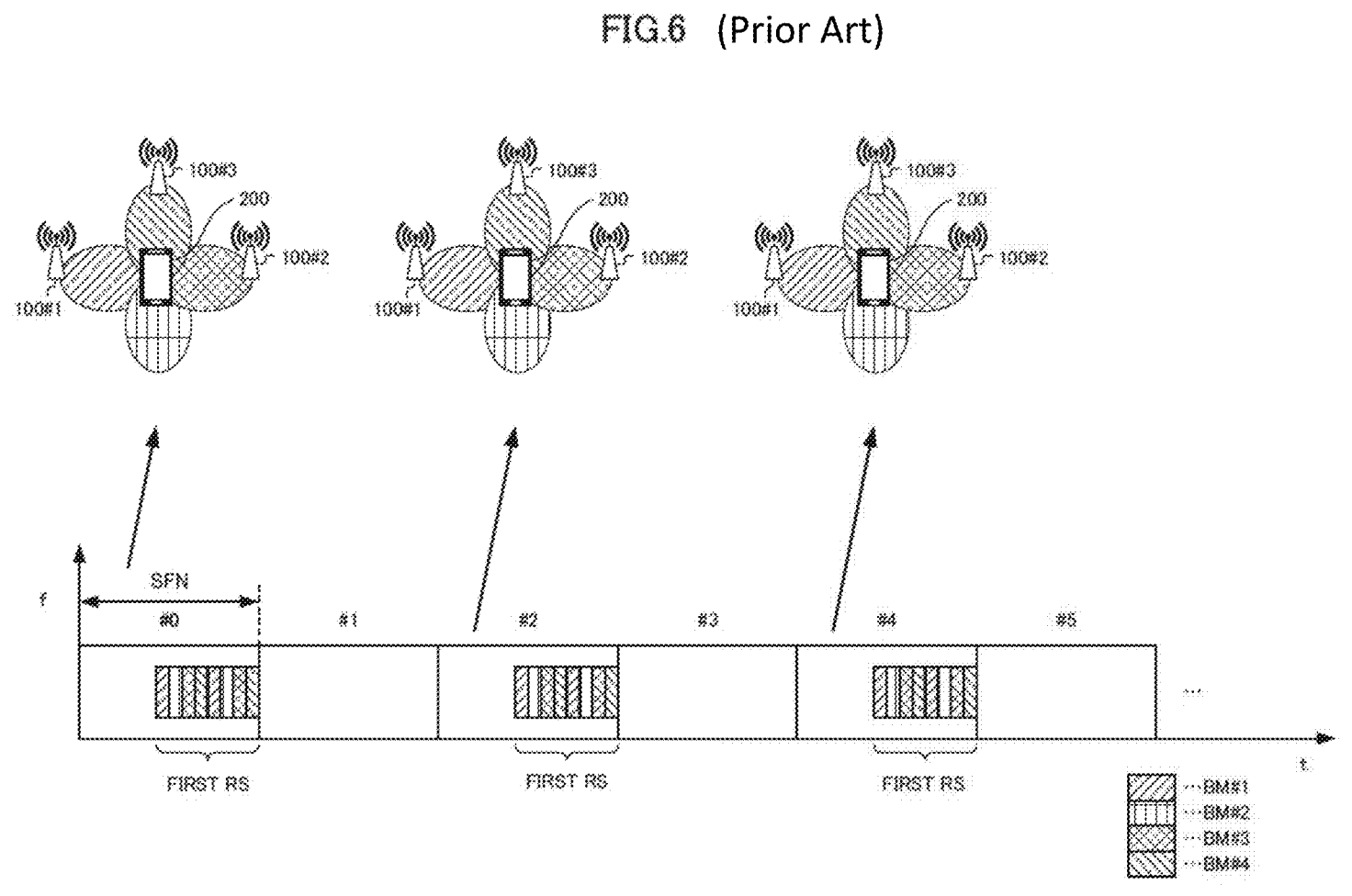

As shown in FIG. 6, the periodic RS may be configured to be transmitted at a period of, for example, 20 msec. In such a case, the periodic RS is transmitted in time division using each beam (BM #1 to BM #4) to cover the coverage area of the hypothetical cell. For example, the UE 200 transmits periodic RS in time division by using BM #1 to BM #4 in SFN #0, SFN #2 and SFN #4 . . . .

For example, the gNB 100 #1 receives the periodic RS transmitted by using the BM #1 and executes measurement of the periodic RS. The gNB 100 #2 receives the periodic RS transmitted by using the BM #3, and executes measurement of the periodic RS. The gNB 100 #3 receives the periodic RS transmitted by using the BM #4, and executes measurement of the periodic RS.

Under such a background, as the number of beams transmitted by the UE 200 increases, the overhead and power consumption of the UE 200 increase. Further, the possibility of transmitting the beam in the direction in which the gNB 100 does not exist increases.

Therefore, in the embodiment, the following mechanism is newly introduced in order to reduce the overhead and power consumption of the UE 200.

(4) Operation Example 1

An operation example 1 of the embodiment will be described below. In operation example 1, it is assumed that the UE 200 performs measurement for the first purpose based on a reference signal (Hereinafter, the 1st RS) used for the first purpose, and performs measurement for the first purpose based on a reference signal (Hereinafter, the 2nd RS) used for the second purpose different from the first purpose. In other words, the gNB 100 performs a measurement related to the first purpose based on the first RS and a measurement related to the first purpose based on the second RS.

In such a case, the UE 200 may omit at least a portion of the transmission of the first RS when it is assumed that measurements for the first purpose will be performed based on the second RS.

Figure 7:
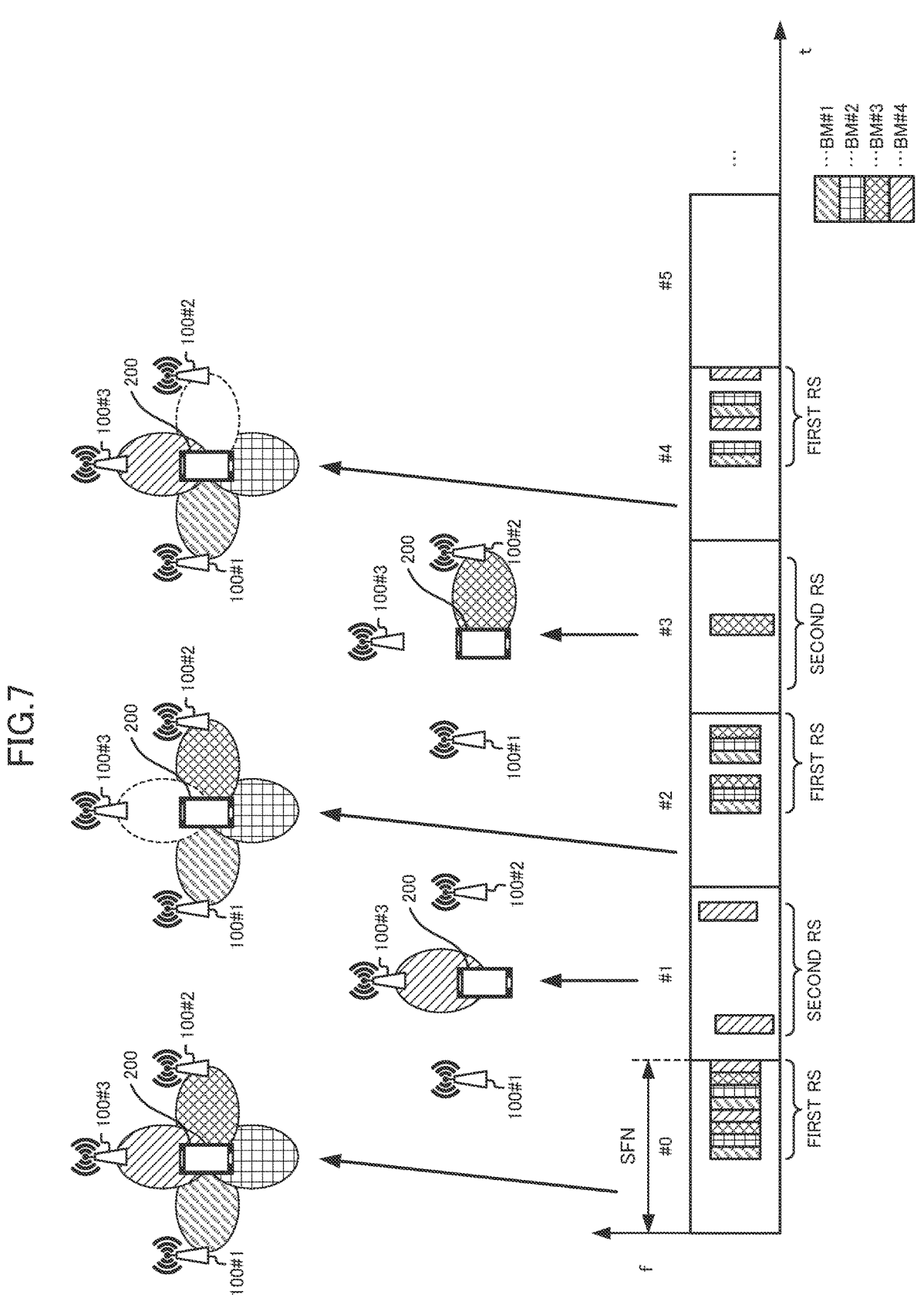
FIG. 7 is a diagram for explaining operation example 1.

For example, as shown in FIG. 7, a case where the second RS is transmitted to the gNB 100 #3 in SFN #1 and the second RS is transmitted to the gNB 100 #2 in SFN #3 will be described.

In such a case, in the SFN #1, the gNB 100 #3 positioned in the arrival direction of the BM #4 performs a measurement related to the first purpose based on the second RS transmitted to the gNB 100 #3. The UE 200 omits the transmission of the first RS using the BM #4 in the SFN #2.

Similarly, in the SFN #3, the gNB 100 #2 positioned in the arrival direction of the BM #3 performs a measurement for the first purpose based on the second RS transmitted to the gNB 100 #2. The UE 200 omits the transmission of the first RS using the BM #3 in the SFN #4.

Hereinafter, details of the above-described operations will be described for each type of specific purpose (first purpose).

(4.1) RRM Measurement

A case where the first purpose is RRM measurement will be described below. The first RS may be a reference signal newly introduced for RRM measurement.

Here, a case where a measurement related to RRM measurement is performed by using the second RS will be mainly described. The measurement for the RRM measurement may be performed using a first RS that is periodically transmitted. The measurement for the RRM measurement may be performed using a DL reference signal (For example, SSB, Periodic CSI-RS, CRS (Cell-specific Reference Signal)).

A DMRS may be used as the second RS. The DMRS may include a DMRS for PUCCH or a DMRS for PUSCH. SRS may be used as the second RS. A PRACH (RA Preamble) may be used as the second RS. These RS-based receive qualities (RSRP, RSRQ, SINR, etc.) may be defined for RRM measurement.

In such a case, the gNB 100 may grasp the transmission power applied to the second RS. The transmit power may be determined by the following options: In option 1, the UE 200 transmits the second RS at the transmission power specified by the gNB 100. In option 2, the UE 200 reports the transmit power applied to the second RS to the gNB 100. In option 3, the UE 200 transmits the second RS with a transmission power defined in advance by radio communication system 10.

The UE 200 may transmit the first RS used in the RRM measurement using a beam different from the beam used in the second RS. For example, the UE 200 may transmit the second RS by using the BM #1 and also transmit the first RS by using the BM #2. The beam may be read as a panel.

In such a case, the parameters used for the transmission of the second RS may be specified by the gNB 100 or may be determined by the UE 200 itself. The parameter may be one or more parameters selected from beam, precoding, Transmission Configuration Indicator (TCI) state, and Quasi-colocation (QCL) source. A part of the parameters used for the transmission of the second RS may be designated by the gNB 100, and the remaining parameters used for the transmission of the second RS may be determined by the UE 200 itself.

Here, the UE 200 may omit at least a part of the transmission of the first RS periodically transmitted when a specific condition is satisfied. In other words, the gNB 100 need not assume reception of at least a part of the first RS periodically transmitted when a specific condition is satisfied. Conversely, the UE 200 may execute the transmission of the first RS that is periodically transmitted when a specific condition is not satisfied. In other words, the gNB 100 may assume the reception of the first RS periodically transmitted when the specific condition is not satisfied.

The specific condition may include a condition under which the measurement for the RRM measurement using the second RS is performed within a specific period. The specific cycle may be a transmission cycle of the first RS, a cycle set by the RRC message or the MACCE message, or a cycle defined in advance by radio communication system 10. The specific condition may include a condition that the gNB 100 notifies the UE 200 of the transmission cancellation of the first RS. The transmission cancellation of the first RS may be dynamically notified by a DCI or the like.

Furthermore, the UE 200 may not assume that at least a part of the DL reference signal is received when a specific condition is satisfied. In other words, the gNB 100 may omit at least a part of transmission of the DL reference signal when a specific condition is satisfied. Conversely, the UE 200 may assume the reception of the DL reference signal when the specific condition is not satisfied. In other words, the gNB 100 may transmit the DL reference signal when the specific condition is not satisfied.

The specific condition may include a condition under which the measurement for the RRM measurement using the second RS is performed within a specific period. The specific period may be a transmission period of the DL reference signal, a period set by the RRC message or the MACCE message, or a period defined in advance by radio communication system 10. The specific condition may include a condition that the gNB 100 notifies the UE 200 that the DL reference signal is not transmitted. The DCI or the like may dynamically notify that the DL reference signal is not transmitted.

The UE 200 may dynamically request the gNB 100 to transmit the DL reference signal. For example, the UE 200 may dynamically request the transmission of the DL reference signal when the transmission of the RS for RRM measurement using the second RS cannot be executed within a specific period. The specific period may be a transmission period of the DL reference signal, a period set by the RRC message or the MACCE message, or a period defined in advance by radio communication system 10. The UE 200 may execute a specific UL transmission for dynamically requesting the transmission of the DL reference signal at a predetermined time before the timing for transmitting the DL reference signal. The specific UL transmission may be a transmission of the specific UCI via PUCCH or a transmission of the specific UCI via PUSCH. The specific UL transmission may be the transmission of the specific RA Preamble via PRACH or the transmission of the RA Preamble using the specific resource. The specific UL transmission may be the transmission of an SRS using a specific sequence or the transmission of an SRS using a specific resource.

Further, a reference signal (Hereinafter, the dynamic DL reference signal) dynamically transmitted from the gNB 100 may be introduced as the DL reference signal used in the RRM measurement. The dynamic DL reference signal may include DMRS for PDCCH or DMRS for PDSCH. The dynamic DL reference signal may be used in combination with the first RS described above or with the second RS described above.

(4.2) L1-RSRP_SINR Measurement

Hereinafter, a case where the first purpose is L1-RSRP_SINR measurement will be described. The first RS is a reference signal used in the L1-RSRP_SINR measurement. Such an RS may be regarded as an SRS in a case where beam management based on an SRS is set.

Here, a case where the measurement of L1-RSRP_SINR measurement is performed by using the second RS will be mainly described. The measurement for L1-RSRP_SINR measurement may be performed using a first RS that is periodically transmitted. The measurement for L1-RSRP_S-INR measurement may be performed using a DL reference signal (For example, SSB, Periodic CSI-RS, Semi-persistent CSI-RS, Aperiodic CSI-RS).

A DMRS may be used as the second RS. The DMRS may include a DMRS for PUCCH or a DMRS for PUSCH. SRS for Positioning may be used as the second RS. A PRACH (RA Preamble) may be used as the second RS. These RS-based receive qualities (RSRP, RSRQ, SINR, etc.) may be defined for the L1-RSRP_SINR measurement.

In such a case, the gNB 100 may grasp the transmission power applied to the second RS. The transmit power may be determined by the following options: In option 1, the UE 200 transmits the second RS at the transmission power specified by the gNB 100. In option 2, the UE 200 reports the transmit power applied to the second RS to the gNB 100. In option 3, the UE 200 transmits the second RS with a transmission power defined in advance by radio communication system 10.

The UE 200 may transmit the first RS used in the L1-RSRP_SINR measurement using a beam different from the beam used in the second RS. For example, the UE 200 may transmit the second RS by using the BM #1 and also transmit the first RS by using the BM #2. The beam may be read as a panel.

In such a case, the parameters used for the transmission of the second RS may be specified by the gNB 100 or may be determined by the UE 200 itself. The parameter may be one or more parameters selected from beam, precoding, Transmission Configuration Indicator (TCI) state, and Quasi-co-location (QCL) source. A part of the parameters used for the transmission of the second RS may be designated by the gNB 100, and the remaining parameters used for the transmission of the second RS may be determined by the UE 200 itself.

Here, the UE 200 may omit at least a part of the transmission of the first RS (For example, SRS used in beam management) periodically transmitted when a specific condition is satisfied. In other words, the gNB 100 need not assume reception of at least a part of the first RS periodically transmitted when a specific condition is satisfied. Conversely, the UE 200 may execute the transmission of the first RS that is periodically transmitted when a specific condition is not satisfied. In other words, the gNB 100 may assume the reception of the first RS periodically transmitted when the specific condition is not satisfied.

The specific conditions may include conditions under which the measurement for L1-RSRP_SINR measurement using the second RS is performed within a specific period. The specific cycle may be a transmission cycle of the first RS, a cycle set by the RRC message or the MACCE message, or a cycle defined in advance by radio communication system 10. The specific condition may include a condition that the gNB 100 notifies the UE 200 of the transmission cancellation of the first RS. The transmission cancellation of the first RS may be dynamically notified by a DCI or the like.

Furthermore, the UE 200 may not assume that at least a part of the DL reference signal is received when a specific condition is satisfied. In other words, the gNB 100 may omit at least a part of transmission of the DL reference signal when a specific condition is satisfied. Conversely, the UE 200 may assume reception of a DL reference signal that is periodically transmitted when a specific condition is not satisfied. In other words, the gNB 100 may transmit a DL reference signal that is periodically transmitted when a specific condition is not satisfied.

The specific conditions may include conditions under which the measurement for L1-RSRP_SINR measurement using the second RS is performed within a specific period. The specific period may be a transmission period of the DL reference signal, a period set by the RRC message or the MACCE message, or a period defined in advance by radio communication system 10. The specific condition may include a condition that the gNB 100 notifies the UE 200 that the DL reference signal is not transmitted. The DCI or the like may dynamically notify that the DL reference signal is not transmitted.

The UE 200 may dynamically request the gNB 100 to transmit the DL reference signal. For example, the UE 200 may dynamically request the transmission of the DL reference signal when the transmission of the RS for the L1-RSRP_SINR measurement using the second RS cannot be executed within a specific period. The specific period may be a transmission period of the DL reference signal, a period set by the RRC message or the MACCE message, or a period defined in advance by radio communication system 10. The UE 200 may execute a specific UL transmission for dynamically requesting the transmission of the DL reference signal at a predetermined time before the timing for transmitting the DL reference signal. The specific UL transmission may be a transmission of the specific UCI via PUCCH or a transmission of the specific UCI via PUSCH. The specific UL transmission may be the transmission of the specific RA Preamble via PRACH or the transmission of the RA Preamble using the specific resource. The specific UL transmission may be the transmission of an SRS using a specific sequence or the transmission of an SRS using a specific resource.

(4.3) Positioning Measurement

A case where the first purpose is positioning measurement will be described below. The first RS may be a reference signal (For example, SRS for Positioning) used in the positioning measurement.

Here, a case where the measurement related to the positioning measurement is performed by using the second RS will be mainly described. The positioning measurement may be performed using a first RS that is periodically transmitted. The positioning measurement may be performed using a DL reference signal (For example, PRS).

A DMRS may be used as the second RS. The DMRS may include a DMRS for PUCCH or a DMRS for PUSCH. SRS other than SRS for Positioning may be used as the second RS. A PRACH (RA Preamble) may be used as the second RS. These RS-based measurement metrics (RSRP, RSTD, Rx-Tx Time Difference, etc.) may be defined for Positioning Measurement.

In such a case, the gNB 100 may grasp the transmission power applied to the second RS. The transmit power may be determined by the following options: In option 1, the UE 200 transmits the second RS at the transmission power specified by the gNB 100. In option 2, the UE 200 reports the transmit power applied to the second RS to the gNB 100. In option 3, the UE 200 transmits the second RS with a transmission power defined in advance by radio communication system 10.

The UE 200 may transmit the first RS used in the positioning measurement using a beam different from the beam used in the second RS. For example, the UE 200 may transmit the second RS by using the BM #1 and also transmit the first RS by using the BM #2. The beam may be read as a panel.

In such a case, the parameters used for the transmission of the second RS may be specified by the gNB 100 or may be determined by the UE 200 itself. The parameter may be one or more parameters selected from beam, precoding, Transmission Configuration Indicator (TCI) state, and Quasi-co-location (QCL) source. A part of the parameters used for the transmission of the second RS may be designated by the gNB 100, and the remaining parameters used for the transmission of the second RS may be determined by the UE 200 itself.

Here, the UE 200 may omit at least a part of the transmission of the first RS periodically transmitted when a specific condition is satisfied. In other words, the gNB 100 need not assume at least a part of the reception of the first RS which is periodically transmitted when a specific condition is satisfied. Conversely, the UE 200 may execute the transmission of the first RS that is periodically transmitted when a specific condition is not satisfied. In other words, the gNB 100 may assume the reception of the first RS periodically transmitted when the specific condition is not satisfied.

The specific conditions may include conditions under which measurements for positioning measurement using the second RS are performed within a specific period. The specific cycle may be a transmission cycle of the first RS, a cycle set by the RRC message or the MACCE message, or a cycle defined in advance by radio communication system 10. The specific condition may include a condition that the gNB 100 notifies the UE 200 of the transmission cancellation of the first RS. The transmission cancellation of the first RS may be dynamically notified by a DCI or the like.

Furthermore, the UE 200 may not assume that at least a part of the DL reference signal is received when a specific condition is satisfied. In other words, the gNB 100 may omit at least a part of transmission of the DL reference signal when a specific condition is satisfied. Conversely, the UE 200 may assume the reception of the DL reference signal when the specific condition is not satisfied. In other words, the gNB 100 may transmit the DL reference signal when the specific condition is not satisfied.

The specific conditions may include conditions under which measurements for positioning measurement using the second RS are performed within a specific period. The specific period may be a transmission period of the DL reference signal, a period set by the RRC message or the MACCE message, or a period defined in advance by radio communication system 10. The specific condition may include a condition that the gNB 100 notifies the UE 200 that the DL reference signal is not transmitted. The DCI or the like may dynamically notify that the DL reference signal is not transmitted.

The UE 200 may dynamically request the gNB 100 to transmit the DL reference signal. For example, the UE 200 may dynamically request the transmission of the DL reference signal when the transmission of the RS for positioning measurement using the second RS cannot be executed within a specific period. The specific period may be a transmission period of the DL reference signal, a period set by the RRC message or the MACCE message, or a period defined in advance by radio communication system 10. The UE 200 may execute a specific UL transmission for dynamically requesting the transmission of the DL reference signal at a predetermined time before the timing for transmitting the DL reference signal. The specific UL transmission may be a transmission of the specific UCI via PUCCH or a transmission of the specific UCI via PUSCH. The specific UL transmission may be the transmission of the specific RA Preamble via PRACH or the transmission of the RA Preamble using the specific resource. The specific UL transmission may be the transmission of an SRS using a specific sequence or the transmission of an SRS using a specific resource.

Further, a reference signal (Hereinafter, the dynamic DL reference signal) dynamically transmitted from the gNB 100 may be introduced as the DL reference signal used in the positioning measurement. The dynamic DL reference signal may include DMRS for PDCCH or DMRS for PDSCH. The dynamic DL reference signal may be used in combination with the first RS described above or with the second RS described above.

(5) Operation Example 2

An operation example 2 of the embodiment will be described below. In operation example 2, UE 200 transmits a reference signal (dynamic RS) that is dynamically transmitted for a specific purpose. In other words, the gNB 100 performs a measurement for a specific purpose based on the dynamic RS.

In such a case, the UE 200 may transmit a periodic RS for a specific purpose, as described with reference to FIG. 6. The gNB 100 may perform a measurement for a specific purpose based on the periodic RS. The UE 200 may omit at least some of the periodic RS transmissions when it is assumed that measurements for a particular purpose will be performed based on the dynamic RS.

Figure 8:
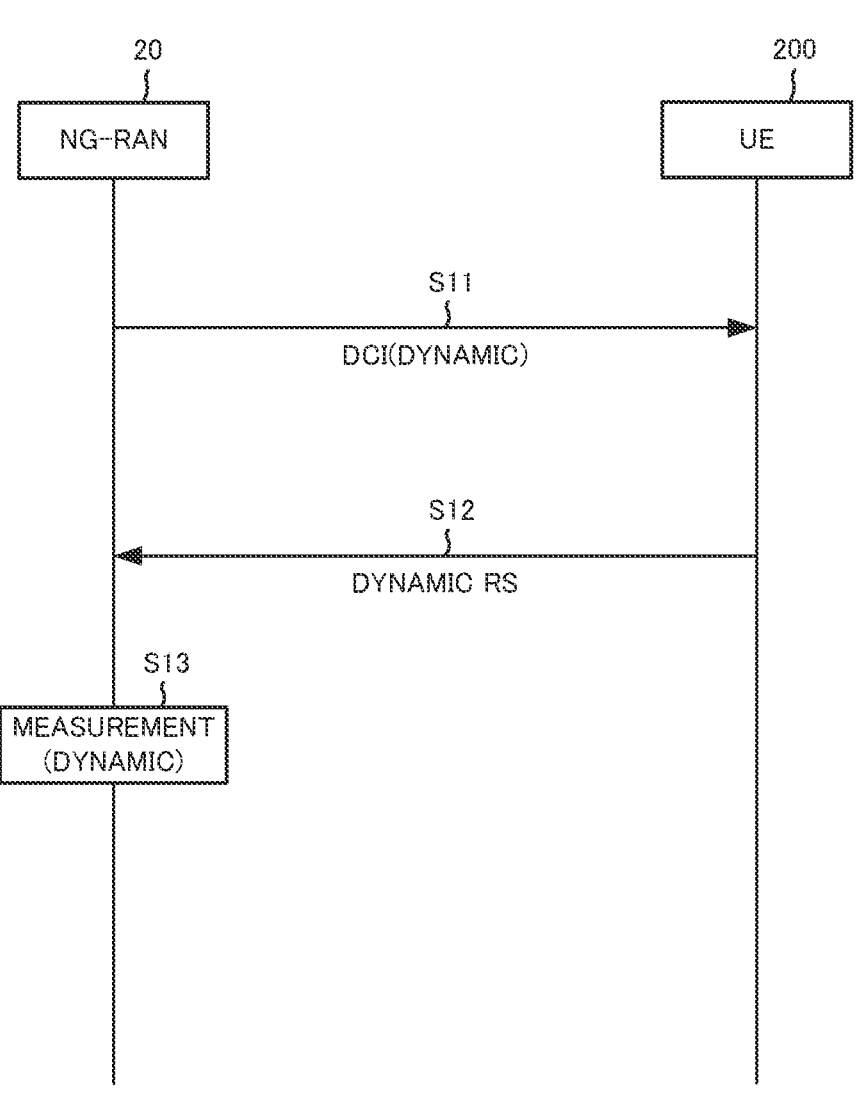
FIG. 8 is a diagram for explaining operation example 2.

For example, as shown in FIG. 8, in step 11, the NG-RAN 20 (gNB 100) transmits a DCI (Dynamic) instructing the transmission of the dynamic RS to the UE 200.

In step 12, the UE 200 transmits a dynamic RS for a specific purpose based on the DCI (Dynamic).

In step 13, the NG-RAN 20 (gNB 100) performs a measurement (Dynamic) for a specific purpose based on the dynamic RS.

Here, the following optional DCI may be used as the DCI (Dynamic). In Option 1, the DCI (Dynamic) may be a scheduling DCI for each of the 200 UEs. In Option 2, the DCI (Dynamic) may be a non-scheduling DCI for each of the 200 UEs. In option 3, the DCI (Dynamic) may be a Group-common DCI common to 2 or more UEs 200. In option 4, the DCI (Dynamic) may be a cell specific DCI or a beam specific DCI. Two or more options selected from options 1 to 4 may be applied. Which option to apply may be set to UE 200 by gNB 100. Which option to apply may be set by the RRC message or by the MAC CE.

The DCI (Dynamic) described above may be read as a MAC CE message. The MAC CE message may include an Information Element (Activation) requesting activation of a measurement using dynamic RS. The MAC CE message may include an information element (Deactivation) requesting the deactivation of a measurement using dynamic RS.

(5.1) RRM Measurement

A case where the specific purpose is RRM measurement will be described below. The UE 200 transmits a dynamic RS used in the RRM measurement. The dynamic RS may be considered as a newly introduced reference signal for RRM measurement.

In such a case, a minimum difference (For example, Minimum delay) between the timing of receiving a notification (DCI or MAC CE message) instructing the transmission of the dynamic RS and the timing of performing the measurement for the RRM measurement may be defined. The timing for performing the measurement for the RRM measurement may be the Symbol for starting the measurement for the RRM measurement or the beginning of the Slot for starting the measurement for the RRM measurement. The minimum delay may be expressed in terms of a Symbol number or in terms of an absolute time.

The minimum delay may be reported to NG RAN 20 as UE 200 capability information. The minimum delay may be predefined in radio communication system 10. For example, the minimum delay may be defined according to the type of specific purpose (In this case, the RRM Measurement), by frequency range (FR), by frequency band (Band), or by SCS. The minimum delay may be defined for each number of periodic RSs to be measured. The minimum delay may be defined by two or more parameters selected from the specific purpose type, frequency range (FR), frequency band (Band), SCS and the number of periodic RSs.

A notification (DCI or MAC CE message) indicating a measurement using dynamic RS may include the following optional information elements: In option 1, the notification may include an information element indicating whether or not to direct the transmission of a dynamic RS. In option 2, the notification may include an information element that indicates the time resource information (For example, Slot offset, symbol position) of the dynamic RS. In option 3, the notification may include an information element indicating the time period (transmission period) during which the transmission of the dynamic RS is performed. In option 4, the notification may include an information element indicating frequency resource information (For example, RB offset, number of RBs, RB position) of the dynamic RS. In option 5, the notification may include an information element that indicates a sequence of dynamic RSs (For example, series index, scrambling ID). In option 6, the notification may include an information element that indicates the transmit power information of the dynamic RS. The notification may include two or more optional information elements selected from options 1 to 6.

Further, the communication node may transmit, by communication between the communication nodes, content related to a notification instructing measurement using dynamic RS to other communication nodes. The communication node may receive from other communication nodes, by communication between the communication nodes, content related to a notification instructing measurement using dynamic RS. The communication nodes may include gNB to gNB, IAB (Integrated Access and Backhaul) nodes, gNB-IAB nodes, TRP (Transmission Reception Point) to gNB-UE, UE to UE, and the like. The content for a notification indicating a measurement using dynamic RS may include one or more optional information elements selected from options 1 to 6 described above.

Periodic RS may be used in conjunction with dynamic RS. In such a case, the UE 200 may omit at least a portion of the periodic RS transmission when a specific condition is satisfied. In other words, the gNB 100 may not assume at least a part of reception of the periodic RS when a specific condition is satisfied. Conversely, the UE 200 may perform periodic RS transmission when a specific condition is not satisfied. In other words, the gNB 100 may assume the reception of a periodic RS when a specific condition is not satisfied.

The specific conditions may include conditions under which measurements for RRM measurement using dynamic RS are performed within a specific period. The specific period may be a transmission period of a periodic RS, a period set by an RRC message or a MAC-CE message, or a period defined in advance by radio communication system 10. The specific condition may include a condition in which the gNB 100 notifies the UE 200 that the periodic RS is not transmitted.

Furthermore, the UE 200 may not assume that at least a part of the DL reference signal is received when a specific condition is satisfied. In other words, the gNB 100 may omit at least a part of transmission of the DL reference signal when a specific condition is satisfied. Conversely, the UE 200 may assume the reception of the DL reference signal when the specific condition is not satisfied. In other words, the gNB 100 may transmit the DL reference signal when the specific condition is not satisfied.

The specific conditions may include conditions under which measurements for RRM measurement using dynamic RS are performed within a specific period. The specific period may be a transmission period of the DL reference signal, a period set by the RRC message or the MACCE message, or a period defined in advance by radio communication system 10. The specific condition may include a condition that the gNB 100 notifies the UE 200 that the DL reference signal is not transmitted. The DCI or the like may dynamically notify that the DL reference signal is not transmitted.

The dynamic RS may have a configuration different from the periodic RS. In such a case, the measurement results using dynamic RS may be combined with the measurement results using periodic RS to derive a single measurement metric.

The UE 200 may dynamically request the gNB 100 to transmit a periodic RS. For example, the UE 200 may dynamically request the transmission of a periodic RS when the RRM measurement using the dynamic RS cannot be executed within a specific period. The specific period may be a transmission period of a periodic RS, a period set by an RRC message or a MAC-CE message, or a period defined in advance by radio communication system 10. The UE 200 may execute a specific UL transmission for dynamically requesting the transmission of the periodic RS at a predetermined time before the timing for transmitting the periodic RS. The specific UL transmission may be a transmission of the specific UCI via PUCCH or a transmission of the specific UCI via PUSCH. The specific UL transmission may be the transmission of the specific RA Preamble via PRACH or the transmission of the RA Preamble using the specific resource. The specific UL transmission may be the transmission of an SRS using a specific sequence or the transmission of an SRS using a specific resource.

(6) Action and Effect

In the embodiment, the UE 200 may assume that the measurement for the first purpose is performed using the second RS transmitted for the second purpose different from the first purpose (operation example 1). According to such a configuration, for example, it is possible to reduce the transmission frequency of the first RS used for the first purpose. Therefore, the overhead and power consumption of the UE 200 associated with the transmission of the first RS can be reduced while covering the coverage area of the virtual cell.

As described above, the operation example 1 may be applied to one or more primary purposes selected from RRM measurement, L1-RSRP_SINR measurement, and Positioning measurement.

When the first purpose is RRM measurement, RRC measurement can be appropriately executed while reducing the frequency of periodic transmission of the first RS by diverting the second RS (DMRS, SRS, PRACH, etc.) to RRM measurement while improving the mobility performance by the user centric no cell, and the delay caused by connection disconnection due to failure of handover and addition/deletion of SCells can be suppressed.

When the first purpose is L1-RSRP_SINR measurement, the beam management can be appropriately executed while the transmission frequency of the first RS is reduced by diverting the second RS (DMRS, SRS for Positioning, etc.) to the L1-RSRP_SINR measurement, and the decrease in throughput can be suppressed.

When the first purpose is Positioning Measurement, the position of the UE 200 can be appropriately updated by diverting the second RS (DMRS, SRS other than SRS for Positioning, etc.) to Positioning Measurement, even assuming a case where the UE 200 moves, while reducing the transmission frequency of the first RS (SRS for Positioning, etc.), and the update delay of the position of the UE 200 can be suppressed.

In an embodiment, the UE 200 may dynamically transmit a dynamic RS for a specific purpose (operation example 2). According to such a configuration, by making the dynamic RS on-demand, it is possible to reduce the overhead and power consumption of the UE 200 accompanying the transmission of the RS while covering the coverage area of the virtual cell.

Furthermore, in cases where dynamic RS is used in combination with periodic RS, the transmission frequency of periodic RS may be reduced. Therefore, the overhead and power consumption of the UE 200 associated with the transmission of the periodic RS can be reduced while covering the coverage area of the virtual cells.

As described above, the operation example 2 may be applied to a specific purpose such as RRM measurement.

When the specific purpose is the RRM measurement, the reference signal used in the RRM measurement can be on-demand by introducing the dynamic RS, and the appropriate RRC measurement can be executed for the UE 200 positioned at the cell edge and the UE 200 approaching the cell while reducing the transmission frequency of the periodic RS, and the delay caused by the disconnection due to the failure of the handover and the addition/deletion of the SCell can be suppressed.

(7) Other Embodiments

Although the contents of the present invention have been described in accordance with the embodiments described above, it is obvious to those skilled in the art that the present invention is not limited to these descriptions and that various modifications and improvements are possible.

In the above-described embodiment, the UE 200 may transmit capability information including an information element indicating whether or not it corresponds to the transmission of the second RS used for the second purpose different from the first purpose to the NG RAN 20 (gNB 100). The UE 200 may transmit capability information for each specific purpose type, frequency range (FR), frequency band (Band), and SCS.

In the above embodiment, the gNB 100 may control the connection of the UE 200 that does not correspond to the transmission of the second RS used for the second purpose different from the first purpose. For example, the gNB 100 may transmit notification information indicating that the connection of the UE 200 corresponding to the transmission of the second RS used for the second purpose different from the first purpose is permitted. The broadcast information may include a MIB (Master Information Block) or a SIB (System Information Block).

In the embodiment described above, the UE 200 may transmit capability information including an information element indicating whether or not it supports the transmission of a dynamic RS to the NG RAN 20 (gNB 100). The UE 200 may transmit capability information for each specific purpose type, frequency range (FR), frequency band (Band), and SCS.

In the embodiment described above, the gNB 100 may control the connection of the UE 200 that does not support the transmission of the dynamic RS. For example, the gNB 100 may transmit notification information indicating that the connection of the UE 200 corresponding to the transmission of the dynamic RS is permitted. The broadcast information may include a MIB or an SIB.

Although not specifically mentioned in the above disclosure, the first and second operations may be combined. In such a case, the transmission period of the periodic RS may be made longer than in the case where the operation example 1 and the operation example 2 are not applied.

The block diagrams (FIGS. 4 and 5) used in the description of the above-described embodiment show blocks in units of functions. Those functional blocks (structural components) can be realized by a desired combination of at least one of hardware and software. Means for realizing each functional block is not particularly limited. That is, each functional block may be implemented using a physically or logically coupled device, or may be implemented using two or more physically or logically separated devices connected directly or indirectly (For example, by using wired, wireless, etc.). The functional block may be implemented by combining software with the one device or the plurality of devices.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 9:
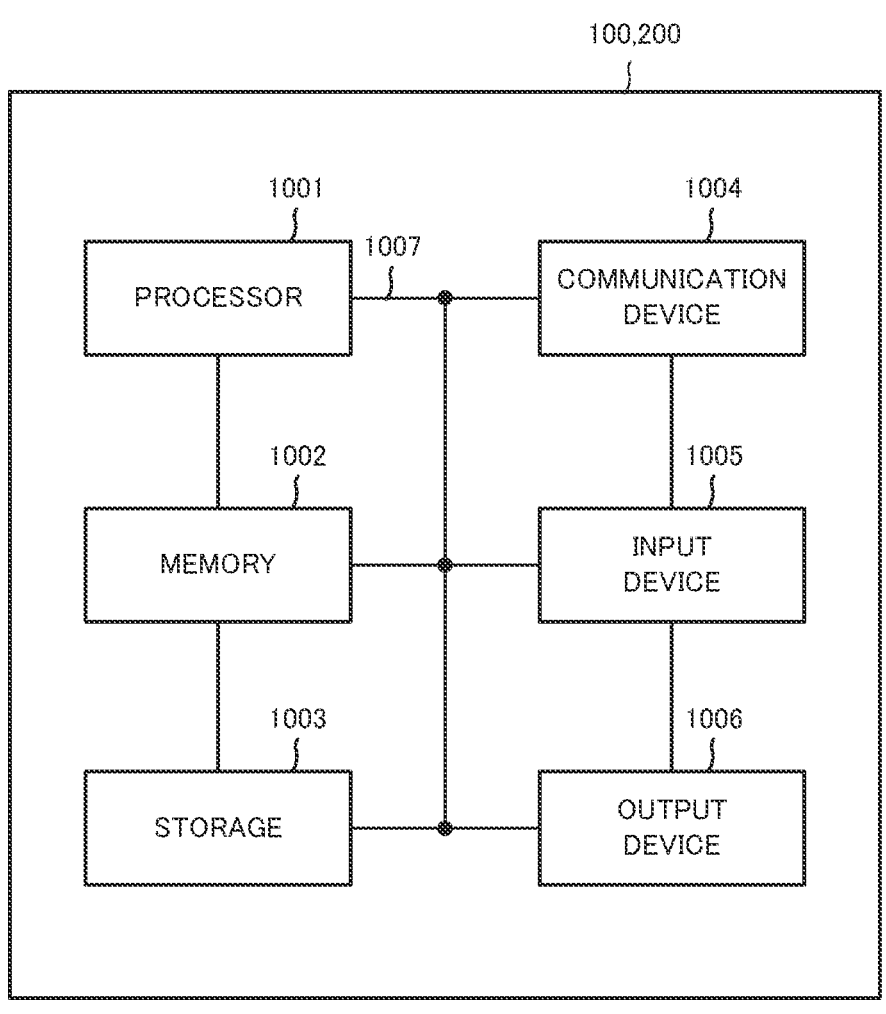
FIG. 9 shows an example of a hardware configuration of the gNB 100 and the UE 200.

Further, the above-mentioned gNB 100 and UE 200 (the apparatus) may function as a computer that performs processing of the radio communication method of the present disclosure. FIG. 9 is a diagram showing an example of a hardware configuration of the apparatus. As shown in FIG.

9, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. The hardware configuration of the device may be configured to include one or more of the devices shown in the figure, or may be configured to exclude some of the devices.

Each functional block of the device (see FIG. 4) is implemented by any hardware element or combination of hardware elements of the computer device.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Further, the various processes described above may be executed by one processor 1001, or may be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network comprising one or more network nodes having a base station, it is apparent that various operations performed for communication with a terminal may be performed by the base station and at least one of other network nodes (For example, but not limited to MME or S-GW) other than the base station. In the above, an example in which there is one network node other than the base station is explained; however, a combination of a plurality of other network nodes (for example, MME and S-GW) may be used.

Information and signals (information, etc.) can be output from an upper layer (or a lower layer) to a lower layer (or an upper layer). It may be input and output via a plurality of network nodes.

The input/output information can be stored in a specific location (for example, a memory) or can be managed in a management table. The input and output information may be overwritten, updated, or appended. The information can be deleted after outputting. The inputted information can be transmitted to another device.

The determination may be made by a value represented by one bit (0 or 1), by a Boolean value (Boolean: true or false), or by a comparison of numerical values (For example, comparison with a given value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if software is transmitted from a website, server, or other remote source using at least one of wired (Coaxial cable, fiber-optic cable, twisted-pair, digital subscriber subscriber line (DSL), etc.) and wireless (Infrared, microwave, etc.) technologies, at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltages, currents, electromagnetic waves, magnetic fields or magnetic particles, optical fields or photons, or any combination thereof.

It should be noted that terms described in this disclosure and terms necessary to understand this disclosure may be replaced with terms having the same or similar meaning. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station may house one or more (For example, three) cells, also referred to as sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a portion or the entire coverage area of at least one of a base station and a base station subsystem performing communication services in this coverage.

In the present disclosure, the terms "mobile station (Mobile Station: MS)", "user terminal", "user equipment (User Equipment: UE)", "terminal" and the like can be used interchangeably.

A mobile station may be referred to by one skilled in the art as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, the mobile station in the present disclosure may be read as a base station. In this case, the base station may have the function of the mobile station.

The radio frame may comprise one or more frames in the time domain. Each frame or frames in the time domain may be referred to as a sub-frame.

The subframe may further comprise one or more slots in the time domain. The subframe may be a fixed time length (For example, 1 ms) independent of the numerology.

Pneumerology may be a communication parameter applied to at least one of transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may comprise one or more symbols (Orthogonal Frequency Division Multiplexing (OFDM)) symbols, single carrier frequency division multiple access (SC-FDMA) symbols, etc.) in the time domain. A slot may be a unit of time based on the numerology.

A slot may include a plurality of minislots. Each minislot may comprise one or more symbols in the time domain. A minislot may also be called a subslot. A minislot may be composed of fewer symbols than slots. A PDSCH (or PUSCH) transmitted in time units larger than the minislot may be referred to as a PDSCH (or PUSCH) mapping type A. A PDSCH (or PUSCH) transmitted using a minislot may be referred to as a PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as the transmission time interval (TTI), a plurality of consecutive subframes may be referred to as TTI, and one slot or one minislot may be referred to as TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (That is, one or more slots or one or more minislots) may be the minimum time unit for scheduling. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long sub-frame, a slot, and the like. A TTI shorter than a normal TTI may be referred to as a shortened TTI, a short TTI, a partial or fractional TTI, a shortened subframe, a short subframe, a minislot, a subslot, a slot, or the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and the frequency domain, and may include one or more continuous subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI in length. The one TTI, one subframe, and the like may each comprise one or a plurality of resource blocks.

The one or more RBs may be referred to as a physical resource block (PRB), a sub-carrier group (SCG), a resource element group (REG), a PRB pair, an RB pair, or the like.

The resource block may comprise one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or more BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes contained in a radio frame, the number of slots per subframe or radio frame, the number of minislots contained in a slot, the number of symbols and RBs contained in a slot or minislot, the number of subcarriers contained in an RB, and the number of symbols, symbol length, and cyclic prefix (CP) length in a TTI may be varied in various ways.

The term "connected", "coupled", or any variation thereof, refers to any direct or indirect connection or cou-pling between two or more elements and may include the presence of one or more intermediate elements between two elements that are "connected" or "coupled" to each other. The coupling or connection between the elements may be physical, logical, or a combination thereof. For example, "connection" may be read as "access". As used in the present disclosure, the two elements may be considered to be "connected" or "coupled" to each other using at least one of one or more electrical wires, cables and printed electrical connections and, as some non-limiting and non-comprehensive examples, electromagnetic energy having wavelengths in the radio frequency region, microwave region and light (both visible and invisible) region.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to elements using the designation "first," "second," etc., as used in this disclosure does not generally limit the amount or order of those elements. Such designa-tions can be used in the present disclosure as a convenient way to distinguish between two or more elements. Thus, references to the first and second elements do not imply that only two elements may be employed therein, or that the first element must in some way precede the second element.

In the present disclosure, the used terms "include", "including", and variants thereof are intended to be inclusive in a manner similar to the term "comprising". Furthermore, the term "or" as used in this disclosure is not intended to be an exclusive OR.

Throughout this disclosure, for example, during transla-tion, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or"decision" may include regarding some action as "judgment" or"decision". More-over, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without depart-ing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
110 Reception unit
120 Transmission unit
130 Control unit
200 UE 210 Radio signal transmission/reception unit
220 Amplifier unit
230 Modulation/demodulation unit
240 Control signal/reference signal processing unit
250 Encoding/decoding unit
260 Data transmission/reception unit
270 Control unit
1001 Processor
1002 Memory
1003 Storage
1004 Communication device
1005 Input device
1006 Output device
1007 Bus

The invention claimed is:

1. A terminal comprising:
a transmitter that transmits a reference signal used for a purpose other than a measurement related to a radio resource management; and
a processor that assumes the measurement related to the radio resource management is performed using the reference signal.

2. A terminal comprising:
a receiver that receives a notification indicating a transmission of a dynamic reference signal dynamically transmitted as a reference signal used for a measurement related to a radio resource management; and
a transmitter that transmits the dynamic reference signal based on the notification.

3. A base station comprising:
a receiver that receives a reference signal used for a purpose other than a measurement related to a radio resource management; and
a processor that performs the measurement related to the radio resource management using the reference signal.

4. A base station comprising:
a transmitter that transmits a notification indicating a transmission of a dynamic reference signal dynamically transmitted as a reference signal used for a measurement related to a radio resource management;
a receiver that receives the dynamic reference signal; and
a processor that performs the measurement related to the radio resource management using the dynamic reference signal.

5. A radio communication method comprising:
transmitting a reference signal used for a purpose other than a measurement related to a radio resource management; and
assuming the measurement related to the radio resource management is performed using the reference signal.

6. A radio communication method comprising:
receiving a notification indicating a transmission of a dynamic reference signal dynamically transmitted as a reference signal used for a measurement related to a radio resource management; and
transmitting the dynamic reference signal based on the notification.

* * * * *